C. O. ANDERSON.
COW MILKING MACHINE.
APPLICATION FILED SEPT. 16, 1918.

1,316,072.

Patented Sept. 16, 1919.
2 SHEETS—SHEET 1.

Witnesses
H. Smedberg
M. Smedberg

Inventor
Carl Oscar Anderson

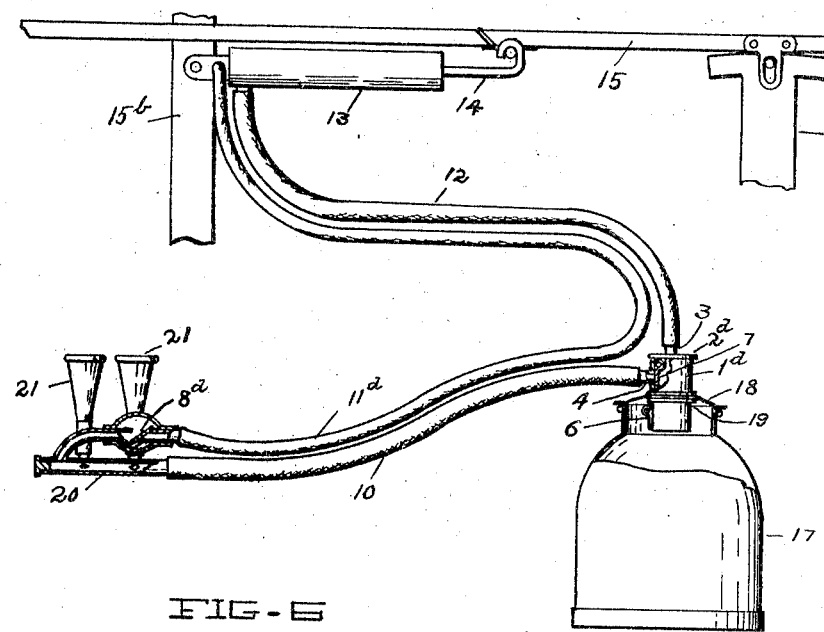
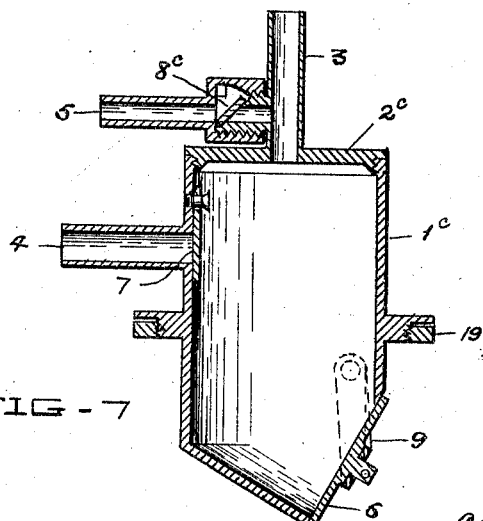

UNITED STATES PATENT OFFICE.

CARL OSCAR ANDERSON, OF SPRINGFIELD, ILLINOIS.

COW-MILKING MACHINE.

1,316,072.  Specification of Letters Patent.  Patented Sept. 16, 1919.

Application filed September 16, 1918. Serial No. 254,338.

*To all whom it may concern:*

Be it known that I, CARL OSCAR ANDERSON, a citizen of the United States, and residing at Springfield, county of Sangamon, and State of Illinois, have invented a new and useful Improvement in Cow-Milking Machines, of which the following is a full, clear, and exact description, reference being had to the accompanying drawings, which form a part of this specification.

This invention relates to improvements in milking machines of that class which is operated by intermittent suction such as those shown and described in my Patents Nos. 1,118,257 and 1,118,258, and more particularly when the suction impulses are produced by valveless reciprocating pumps.

The objects of the present invention are to provide a simple, durable, inexpensive and easily cleaned milking machine of highest efficiency, adapted to conform as nearly as possible to the natural way of drawing the milk from the cow and to convey the milk to the receptacle without undue agitation or churning, and without interfering with the milking operation.

Heretofore in milking machines of this class the hose or conduit conveying the milk from the teatcups to the milk receptacle has also been utilized for the return air current to the teatcups causing a back and forth churning motion on the milk then in the conduit. The interference of the milk and air in the tube also has a detrimental effect on the milk in the action of the machine. The milk also interferes with the efficiency of the machine. To overcome this defect, I use a valved milk conduit between the teat cup and milk receiving chamber so the milk can flow only in one direction and a separate valved air conduit so no milk can interfere with the air current and the air can flow only in one direction, *i. e.* toward the teat cup. Both the milk conduit and air conduit are in communication with a valveless reciprocating pump.

The invention will first be hereinafter more fully described with reference to the accompanying drawings, which are to be taken as a part of this specification and then finally pointed out in the claims.

In said drawings, Figure 1 represents a vertical sectional elevation of a milk receiving chamber embodying the preferred construction of my invention; Fig. 2 is a transverse section taken at line X Fig. 1.

Fig. 6 is a side elevation showing a complete milking machine unit of modified arrangement. Fig. 7 illustrates another modification of a milk receiving chamber.

Figure 5:
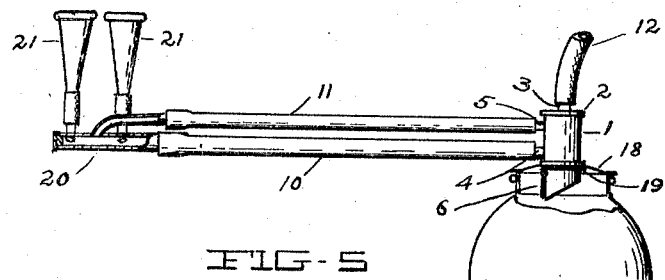
Fig. 5 is a side elevation of a milking machine embodying my invention and showing the relation of the various parts as they are assembled and in operation.
Figure 2:
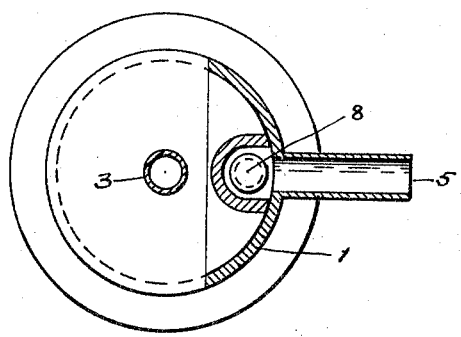
Figure 4:
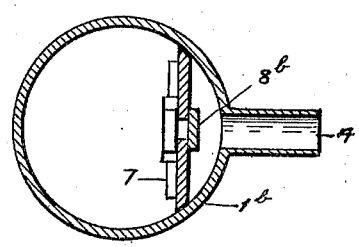
Fig. 4 is a transverse section taken at line Z Fig. 3.

Referring to the drawings, 1, $1^b$, $1^c$, and $1^d$ represents a body or casing of a milk receiving chamber having an inclined lower end wall 2, $2^b$, $2^c$, and $2^d$ a removable cover or top for the same, 3 an air exhaust tube in said top, 4 a milk inlet tube, 5 an air passage toward the teat cups, 6 represents a milk outlet valve located in the lower portion of the side wall of the milk chamber, 7 a milk inlet valve, 8, $8^b$, $8^c$, or $8^d$ an air vent check valve opening outwardly from the milk chamber, 9 a hinged support for valve 6, 10 a flexible milk conduit connected to tube 4, 11 and $11^d$ a flexible air conduit connected to passage 5, 12 is a flexible suction conduit, connecting milk receiving chamber 1 through tube 3 to a valveless reciprocating pump 13, 14 is a piston and piston rod in said pump 13, 15 is a reciprocating bar adapted to transmit the motion to pump piston 14. The pump 13 is removably carried by bar 15 and the post $15^b$. It is important to have pump 13 portable so the whole milking unit can be carried from one place of the barn to another as desired, 16 is a support for bar 15 and oscillating with same being pivoted at its lower end (not shown), 17 is a milk receptacle of any suitable kind, 18 a lid or cover to which chamber 1 is held fast by clamping nut 19, 20 is a connecting tube for teat cups 21 and air conduit 11.

Figure 1:
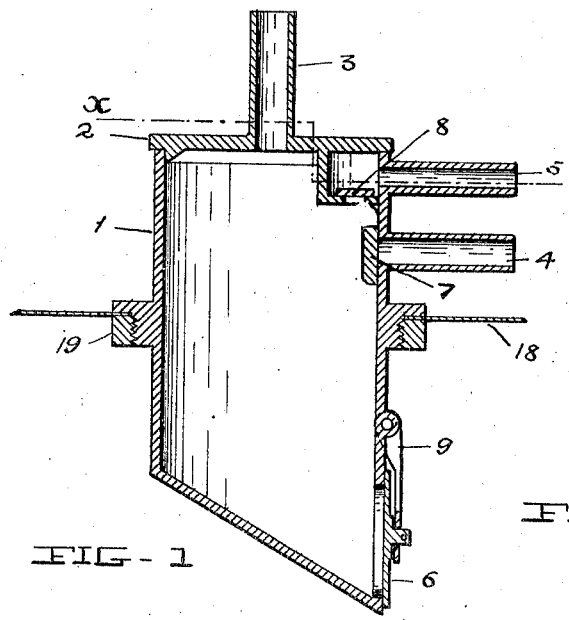

Figs. 1 and 5 show my preferred construction, the milk receiving chamber having both air and milk connections located at the upper end of the wall. The air vent valve or check valve 8, is located in a separate air chamber, three sides of which are formed by the wall of the milk chamber lid and removable therewith while the remaining side is formed by the wall of the milk chamber. The milk inlet valve is pivoted to the lower wall of said valve chamber, also supported by the lid and removable therewith, making the whole apparatus easily cleaned.

Fig. 6 shows a modification of a complete milking machine, the milk receiving chamber may be of any construction having a suction connection, a valved milk inlet and a valved milk outlet; the air release is effected direct from pump 13 through hose 11ᵈ, check valve 8ᵈ, in the claw into the teat cups during the instroke of pump piston 14. Check valve 8ᵈ serves to prevent milk from passing into hose 11ᵈ, and the pump during the outstroke of pump piston 14.

Fig. 7 differs from Figs. 1 and 5 in that the air check valve is located on the outside of the milk-receiving chamber on the suction conduit or nipple 3.

In describing the operation I will refer first to Fig. 6. After the machine is assembled as illustrated, rod 15 is put in reciprocating motion by some commonly used means (not shown) which in turn acts on pump piston 14 causing it to move in unison with it; as piston 14 moves out in pump cylinder 13, a partial vacuum is created extending through hose 12, chamber 1, hose or conduit 10 and in teat cups 21. When the cups 21 are held under a cow's teats, they are drawn into the cups by the suction. At the end of the outstroke of piston 14, valve 7 closes passage 4 automatically. At the instroke of piston 14, a slight pressure is created in hose 12, and chamber 1 causing valve 6 to open outward and also at the same time causing an air current to flow through hose 11 into teat cups 21. It will be noticed that valve 8ᵈ opens toward the teatcups and allows the air to flow only in that direction. As the motion of piston 14 is reversed and the piston is moving outward valve 8ᵈ closes the air passage and suction is again conveyed through hose 12, chamber 1, hose 10, connector 20 into teatcups 21, acting on the cow's teats and drawing milk therefrom. The milk thus drawn will pass through hose 10 into chamber 1. As the motion of piston 14 is again reversed, valve 7 closes and the milk remaining in the hose 10 is left undisturbed until next suction impulse, valve 6 is now pushed open by the pressure from the pump and weight of the milk allowing the milk to flow into receptacle 17, simultaneously the pressure from the pump passes through hose 11, and valve 8 into teatcups 21, fully relieving the tension on the teats caused by the suction impulse. The action described is repeated until all the milk is drawn from the cow.

The modifications tend to show that the air valve may be located either near the teat cups, just outside the milk receiving chamber or inside same; the milking action is in all cases the same.

Figure 3:
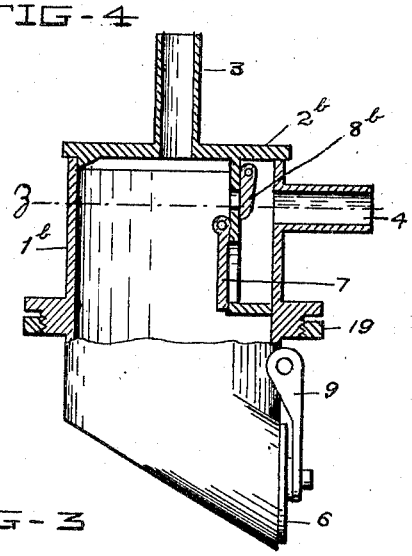
Fig. 3 is a modification of Fig. 1

Fig. 3 is a modification of the milk receiving chamber having one large milk and air conduit near the top of chamber having its inner wall integral with the cover, combined with a large milk inlet valve 7 and a much smaller air outlet valve 8 above the same, both located at openings in said wall. This arrangement will eliminate to some extent the churning action of the air current on the milk in the conduit when the milk receiving chamber is level with the teatcup or lower.

Having thus described my invention what I claim as new and desire to secure by Letters Patent of the United States is:—

1. A pneumatic milking machine comprising, a teatcup, a teatcup claw, a milk-receiving chamber having a valved milk-outlet, a valved milk-inlet in communication with said claw, a suction connection, a valveless pump in communication therewith, a separate air pipe from the receiving chamber to the claw, a check valve in said air pipe opening toward the claw and teatcup adapted to admit atmospheric pressure in the claw and teatcup between suction impulses.

2. A pneumatic milking machine, comprising teat cups, a milk receiving chamber provided with a milk inlet normally closed by a valve opening inward, a milk outlet normally closed by a valve opening outward, a suction connection and a valveless pump in connection therewith, a separate valved air passage in communication with said valveless pump and teat cups and a check valve in said passage opening toward the teatcups.

3. A pneumatic milking machine comprising, a milk-receiving chamber provided with a suction connection, a valved milk-outlet, a valved milk-inlet, a teatcup claw in connection with said milk-inlet, a separate air conduit in communication with said claw and chamber, a check valve in said air conduit opening toward teatcup and means to produce intermittent suction in said suction connection.

4. A milking machine comprising, a teatcup, a claw, a milk-receiving chamber, a milk conduit between said claw and receiving chamber, a check valve for said milk conduit opening toward said receiving chamber, a separate air conduit between the chamber and claw in communication with said teatcup, a check valve in said air conduit opening toward the claw and teatcup, said chamber being provided with a valved milk-outlet, a suction connection, a reciprocating valveless pump in connection therewith, said pump being in communication with the teatcup through the milk conduit and air conduit alternately.

5. A milking machine comprising a milk-receiving chamber having a valved milk-inlet, a teatcup connected to said milk-inlet, a valved milk-outlet, a suction connection, a valveless pump in connection therewith, a separate air pipe in communication with said teatcup and pump, a check valve in said air pipe opening toward said teatcup adapted to admit air from the pump into the teatcup between suction impulses.

6. A milking machine comprising, a milk-receiving chamber having a valved milk-outlet, and a milk-inlet, a teatcup, a milk conduit between said teatcup and milk-inlet, a check valve for said milk conduit opening toward the milk-receiving chamber, a suction connection, a valveless reciprocating pump in connection therewith, a separate air conduit in communication with said teatcup milk-receiving chamber and pump, a check valve in said air conduit normally closed and opened by suction in the teatcup and pressure from the pump.

7. A milking machine comprising, a milk-receiving chamber having a milk outlet normally closed by a gravity operated valve opening outward, a suction connection, a reciprocating valveless pump in connection therewith, a milk-inlet normally closed by a gravity operated valve opening inward, a teatcup in connection therewith, a separate air conduit in communication with said teatcup and pump, a gravity closed check valve in said air conduit, said valve opening toward the teatcup to relieve suction in said teatcup between suction impulses and being closed during suction impulses.

8. A milking machine comprising, a milk-receiving chamber having a suction connection, a milk-outlet, normally closed by a hinged valve opening outward, a milk-inlet normally closed by a hinged valve opening inward, a teatcup and a claw in connection therewith, a separate air conduit between said claw and chamber, a check valve in said air conduit opening toward the teatcup and means to produce suction impulses in said chamber and teat-cup.

9. A milking machine comprising, a milk-receiving chamber having a valved milk-outlet, a valved milk-inlet, a teatcup, a claw interposed between said milk inlet and teatcup, a separate air pipe between said chamber and claw, a check valve in said air pipe opening toward the claw, a suction connection for the milk chamber, a reciprocating valveless pump in connection therewith adapted to produce suction in said teatcup through said valved milk-inlet and alternately relieve such suction through the valved air pipe.

10. A milking machine comprising, a milk-receiving vessel, a cover for same, a milk-receiving chamber mounted on said cover and provided with a valved milk-outlet at the lower end, a valved milk-inlet near the upper end, a milk conveying hose, a claw and the teatcups in connection therewith, a suction connection in said chamber, a portable reciprocating valveless pump in connection therewith, a separate air hose in communication with said pump and teatcups, a check valve holding said air hose normally closed opening only toward the teatcups, means to support the pump and to give the pump piston a reciprocating movement.

In testimony whereof I affix my signature in the presence of two witnesses.

CARL OSCAR ANDERSON.

Witnesses:
C. B. WUNDERLICH,
G. W. JACK.

Copies of this patent may be obtained for five cents each, by addressing the "Commissioner of Patents, Washington, D. C."